US009826110B2

(12) United States Patent
Chopra et al.

(10) Patent No.: US 9,826,110 B2
(45) Date of Patent: Nov. 21, 2017

(54) ADDRESS BOOK TRANSFER OVER A NETWORK BETWEEN PRINTERS

(75) Inventors: Vivek Chopra, Singapore (SG); Kiang Sum Chia, Singapore (SG)

(73) Assignee: Dell Products L.P., Round Rock, TX (US)

( * ) Notice: Subject to any disclaimer, the term of this patent is extended or adjusted under 35 U.S.C. 154(b) by 1286 days.

(21) Appl. No.: 12/911,236

(22) Filed: Oct. 25, 2010

(65) Prior Publication Data

US 2012/0102142 A1  Apr. 26, 2012

(51) Int. Cl.
| | | |
|---|---|---|
| *G06F 15/177* | (2006.01) | |
| *H04N 1/00* | (2006.01) | |
| *G06F 17/30* | (2006.01) | |
| *H04L 12/26* | (2006.01) | |
| *G06F 21/60* | (2013.01) | |

(52) U.S. Cl.
CPC ... *H04N 1/00244* (2013.01); *G06F 17/30017* (2013.01); *G06F 21/606* (2013.01); *H04L 43/0817* (2013.01); *H04N 2201/0039* (2013.01); *H04N 2201/0046* (2013.01); *H04N 2201/0082* (2013.01); *H04N 2201/3208* (2013.01)

(58) Field of Classification Search
CPC .................................... H04N 1/00244
USPC .......................................... 709/217
See application file for complete search history.

(56) References Cited

U.S. PATENT DOCUMENTS

| | | | |
|---|---|---|---|
| 6,147,773 A | 11/2000 | Taylor et al. | |
| 6,292,271 B1 * | 9/2001 | Phan | H04N 1/00384 358/1.15 |
| 8,286,003 B2 * | 10/2012 | Miyamoto | H04N 1/00127 358/402 |
| 2005/0138447 A1 * | 6/2005 | Kobayashi et al. | 713/300 |
| 2006/0067343 A1 * | 3/2006 | Tagawa et al. | 370/401 |
| 2006/0106803 A1 * | 5/2006 | Takeuchi | G06F 21/606 |
| 2006/0253824 A1 * | 11/2006 | Iizuka | 716/11 |
| 2007/0208827 A1 * | 9/2007 | Fukui | H04N 1/00222 709/219 |
| 2007/0230463 A1 * | 10/2007 | Shima | H04L 43/0817 370/389 |
| 2009/0122339 A1 * | 5/2009 | Nakamura | H04M 1/2745 358/1.15 |
| 2010/0023608 A1 * | 1/2010 | Hanano | G06F 17/30017 709/221 |
| 2012/0102142 A1 * | 4/2012 | Chopra | H04N 1/00244 709/217 |

* cited by examiner

*Primary Examiner* — Kyung H Shin
(74) *Attorney, Agent, or Firm* — Haynes and Boone, LLP (57) ABSTRACT

A networked printer system includes a first printer coupled to a network. The first printer includes a first printer address book having a plurality of address book contents that are located in a plurality of Simple Network Management Protocol (SNMP) Object Identifiers (OIDs). A second printer is coupled to the network. The second printer includes a processor, a communications device coupled to the processor, and a computer-readable medium coupled to the processor. An address book transferring engine is located on the computer-readable medium and includes computer-readable instruction that when executed connect to the first printer through the communications device over the network using SNMP, retrieve the plurality of address book contents from the plurality of SNMP OIDs, and transfer the plurality of address book contents to a second printer address book that is associated with the second printer.

18 Claims, 5 Drawing Sheets

ADDRESS BOOK

212

| Contact Name | Contact Email Address | Contact Fax | | |
|---|---|---|---|---|
| Contact 1 | Contact1@email.com | 555-555-1515 | Edit | Delete |
| Contact 2 | Contact2@email.com | 555-555-2515 | Edit | Delete |
| Contact 3 | Contact3@email.com | 555-555-3515 | Edit | Delete |
| Contact 4 | Contact4@email.com | 555-555-4515 | Edit | Delete |
| Contact 5 | Contact5@email.com | 555-555-5515 | Edit | Delete |
| Contact 6 | Contact6@email.com | 555-555-6515 | Edit | Delete |
| Contact 7 | Contact7@email.com | 555-555-7515 | Edit | Delete |
| Contact 8 | Contact8@email.com | 555-555-8515 | Edit | Delete |
| Contact 9 | Contact9@email.com | 555-555-9515 | Edit | Delete |
| Contact 10 | Contact10@email.com | 555-555-1525 | Edit | Delete |
| Contact 11 | Contact11@email.com | 555-555-1535 | Edit | Delete |
| Contact 12 | Contact12@email.com | 555-555-1545 | Edit | Delete |
| Contact 13 | Contact13@email.com | 555-555-1555 | Edit | Delete |
| Contact 14 | Contact14@email.com | 555-555-1565 | Edit | Delete |
| Contact 15 | Contact15@email.com | 555-555-1575 | Edit | Delete |
| | | | | Create |

ADDRESS BOOK TRANSFER OVER A NETWORK BETWEEN PRINTERS

BACKGROUND

The present disclosure relates generally to information handling systems, and more particularly to the transfer of an address book over a network between printers.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may include printers that allow users to print, scan, email, and/or fax documents, photos, and a variety of other materials. For example, a printer may be coupled to one or more IHSs over a network in order to allow the printer to print and/or scan, email and fax to IHSs over the network. The printer will typically include an address book, and that address book may include a plurality of contacts that each include information such as a name, an email address, a fax number, etc. For example, the plurality of contacts may include information for each of the users that use the printer, a plurality of contacts to whom the printer is used to scan, email, or fax documents, and/or a variety of other contacts details known in the art. When the user wishes to replace a printer, it is desirable for the user to transfer the address book from the printer being replaced to the new printer. The transferring of an address book between printers raises a number of issues.

Conventional printers tend to define their address book content fields according to their functional requirements, and different printer suppliers or vendors often define their address book content fields differently as there is no standard format across printers from different suppliers or vendors or even across different generation printers that are from the same supplier or vendor. Thus, it is difficult to quickly and easily transfer address books from one printer to another. For example, the user may be forced to manually enter each piece of contact information that is included in the address book of an existing printer into the address book of a new printer, which is error-prone and time consuming. In order to remedy this, IHS applications have been provided that, once the user transfers a first printer address book from a first printer to an IHS, convert the first printer address book to a format compatible with a second printer and save it on the IHS. The user may then connect the IHS to the second printer and import the converted printer address book to the second printer. Such IHS applications require the use of an IHS and multiple steps by the user in order to transfer the printer address book between printers.

Accordingly, it would be desirable to provide an improved system and method for transferring an address book between printers.

SUMMARY

According to one embodiment, a networked printer system includes a first printer coupled to a network, wherein the first printer includes a first printer address book having a plurality of address book contents that are located in a plurality of Simple Network Management Protocol (SNMP) Object Identifiers (OIDs); and a second printer coupled to the network, wherein the second printer comprises a processor; a communications device coupled to the processor; a computer-readable medium coupled to the processor; and an address book transferring engine that is located on the computer-readable medium and comprises computer-readable instruction that when executed connect to the first printer through the communications device over the network using SNMP; retrieve the plurality of address book contents from the plurality of SNMP OIDs; and transfer the plurality of address book contents to a second printer address book that is associated with the second printer.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
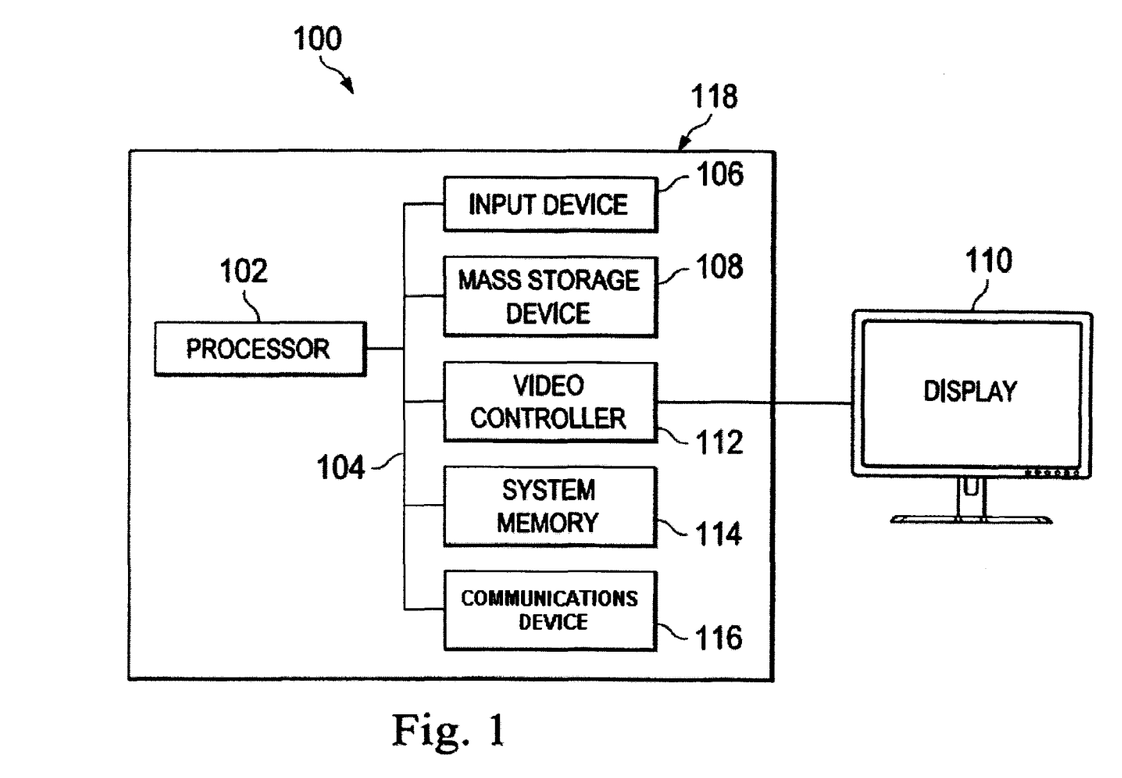
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, the IHS 100 includes a non-transitory computer-readable medium (e.g., the storage 108, the memory 114, etc) that may include computer-readable instructions that, when executed, cause the processor 102 to perform a variety of functions, described in further detail below. A communications device 116 is coupled to processor 102 to allow the IHS 100 to communicate with other devices over a network. In an embodiment, a chassis 118 houses some or all of the components of IHS 100. It should be understood that other buses and intermediate circuits can be deployed between the components described above and processor 102 to facilitate interconnection between the components and the processor 102.

Figure 2A:
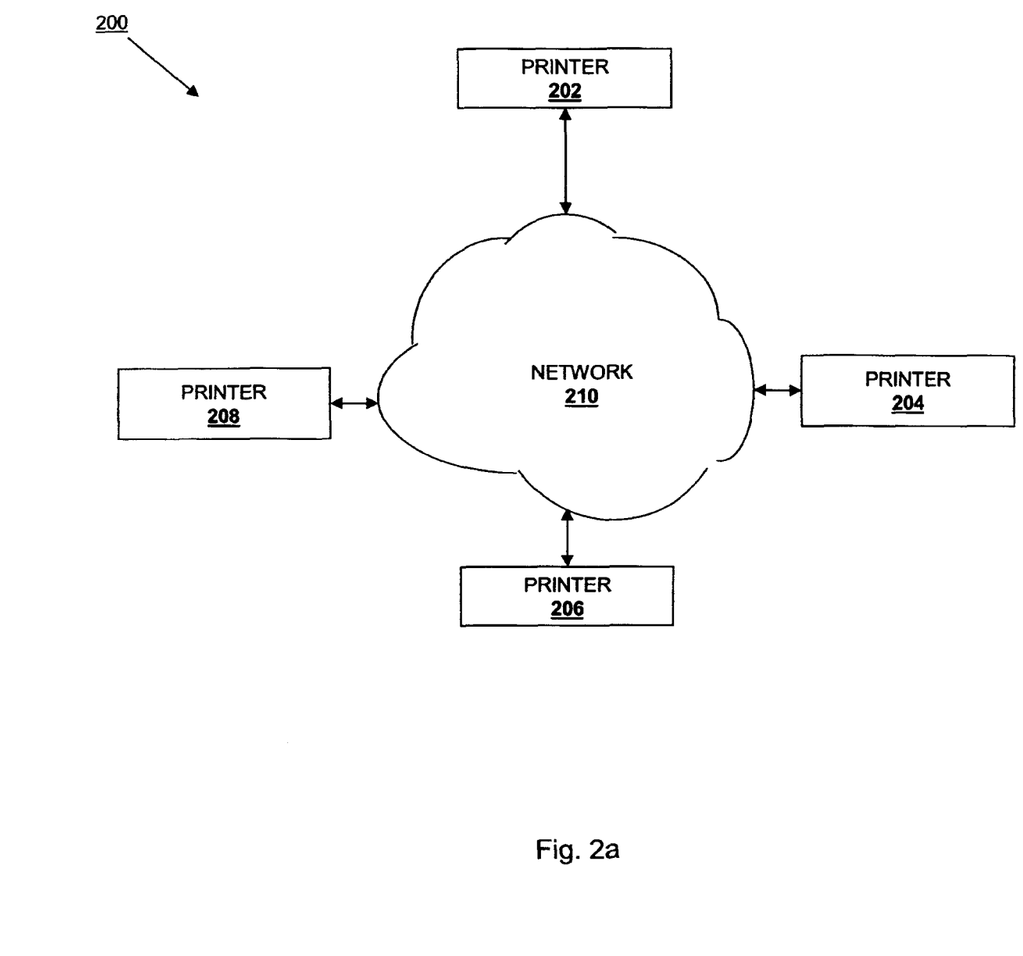
FIG. 2a is a schematic view illustrating an embodiment of a networked printer system.
Figure 2B:
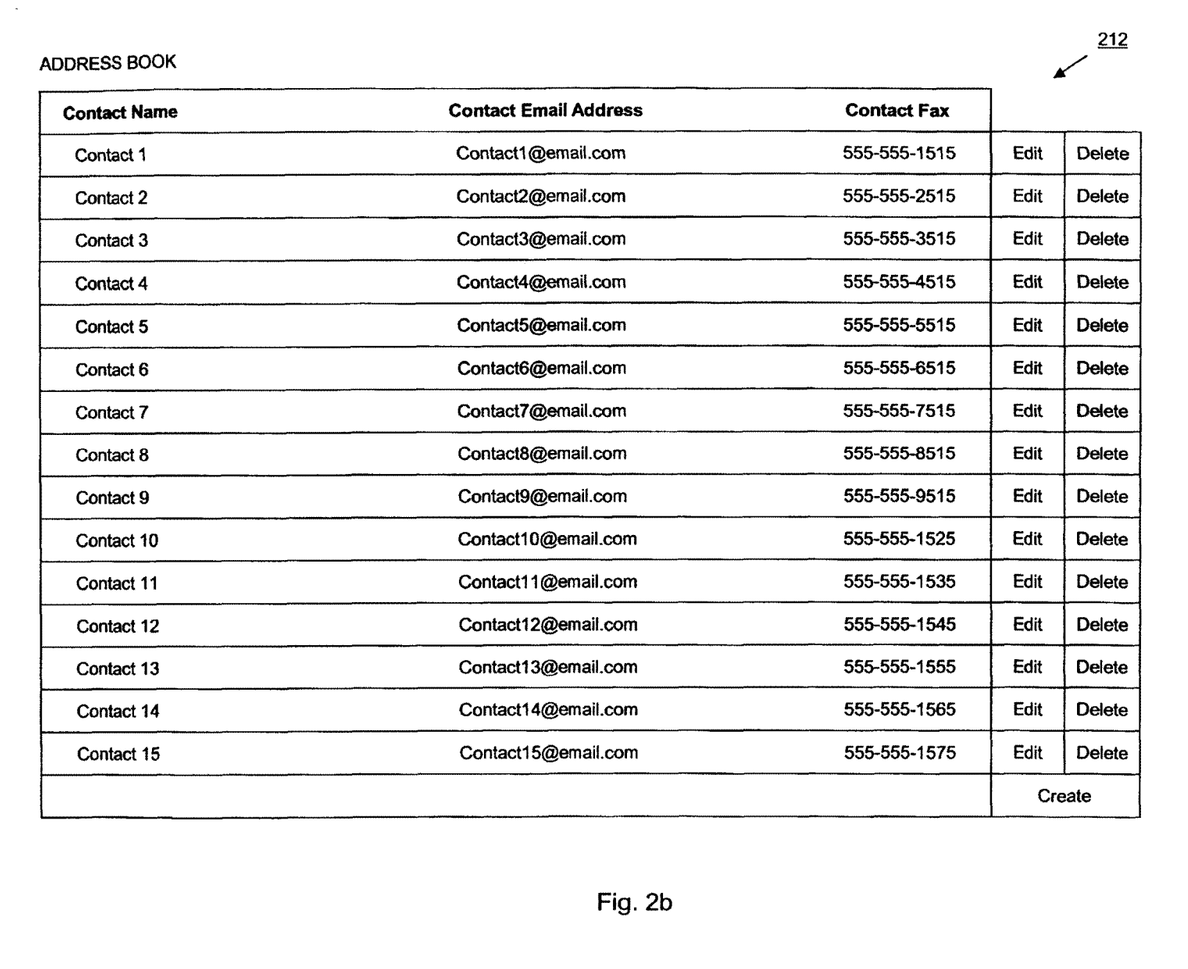
FIG. 2b is a screenshot view illustrating an embodiment of an address book.
Figure 2C:
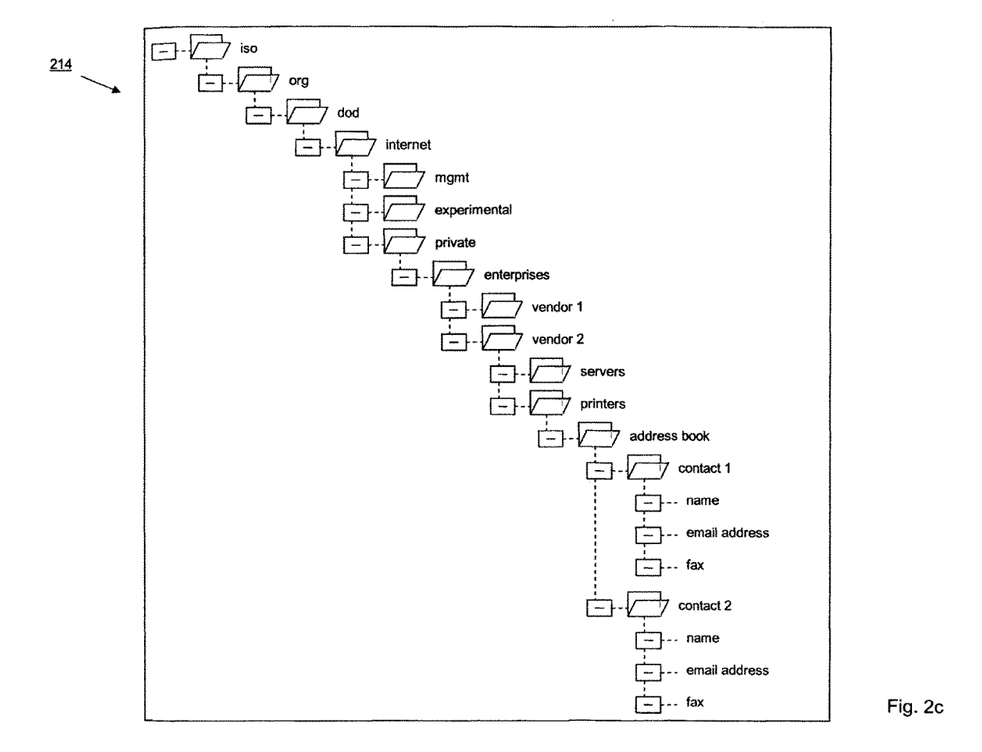
FIG. 2c is a schematic view illustrating an embodiment of a Management Information Base hierarchy including address book content fields implemented as Object Identifiers.

Referring now to FIGS. 2a, 2b, and 2c, a networked printer system 200 is illustrated. The networked printer system 200 may include a plurality of printers 202, 204, 206, and 208 that are connected together through a network 210. In an embodiment, one or more of the printers 202, 204, 206, and 208 may be the IHS 100, described above with reference to FIG. 1, and/or may include one or more of the components of the IHS 100. For example, in addition to including conventional printer components known in the art, the one or more of the printers 202 may also include a printer chassis similar to the chassis 118, a processor similar to the processor 102, an input device similar to the input device 106, a memory similar to the memory 114, and/or a communications device similar to the communications device 116. In an embodiment, one or more of the printers 202, 204, 206, and 208 may be Multi-Functional Printers (MFPs) that each incorporate the functionality of multiple devices. For example, MFPs may act as some combination of a printer, a scanner, a photocopier, a fax machine, an email device, and/or a variety of other devices known in the art. In the discussion below, the printer 202 is used as an example, but one of skill in the art will recognize that the disclosure may apply to any of the printers 202, 204, 206, or 208.

The printer 202 includes an address book 212, an embodiment of a screenshot of which is illustrated in FIG. 2b, that has a plurality of address book contents that are located in a plurality of content fields. In the illustrated embodiment, the plurality of address book contents in the address book 212 are grouped by contacts for whom the address book contents are related. For example, each of the plurality of address book contents for a particular contact in the address book 212 includes a contact name in a contact name field, a contact email address in a contact email address field, and a contact fax number in a contact fax number field. As such, the plurality of address book contents in the content fields of the address book 212 include a first contact name, a first contact email address, and a first contact fax number; a second contact name, a second contact email address, and a second contact fax number; and so on for as many contacts as the address book 212 includes. While a particular address book 212 has been described, one of skill in the art will recognize that the address book for a printer may vary (e.g., more or less address book contents, different organization for address book contents, etc.) without departing from the scope of the present disclosure.

In an embodiment, each the plurality of content fields that may include address book contents in the address book 212 for the printer 202 correspond to Simple Network Management Protocol (SNMP) Object Identifiers (OIDs) in a Management Information Base (MIB) that is used to manage the entities on the networked printer system 200. FIG. 2c illustrates an embodiment of a plurality of OIDs in a MIB hierarchy 214. The MIB hierarchy 214 includes a plurality of levels that have OIDs that may be assigned to a plurality of different organizations. The top levels of the MIB hierarchy 214 may include OIDs that are assigned to standards organizations, while lower levels of the MIB hierarchy 214 may include OIDs that are assigned to vendors (e.g., vendor 1 and vendor 2 in the illustrated embodiment.) The vendors may then define private branches of the MIB hierarchy 214 under their assigned vendor OIDs, and those private branches may include OIDs that uniquely identify managed objects for different products of the vendor. As discussed below, the OIDs in those private branches may be configured to correspond to content fields in a printer address book.

For example, vendor 2 may have been allocated an OID (e.g., 1.3.6.1.4.1.674), and all objects under this OID may then be defined and controlled by vendor 2. In the illustrated embodiment, vendor 2 has defined an OID (e.g., 1.3.6.1.4.1.674.10892) for servers and an OID (e.g., 1.3.6.1.4.1.674.10898) for printers, and has further defined an OID (e.g., 1.3.6.1.4.1.674.10898.200) for an address book that branches off from the printers OID. The content fields for the address book may be implemented as OIDs by defining each contact that may be entered into the address book as an OID (e.g., 1.3.6.1.4.1.674.10898.200.1 for contact 1 OID, 1.3.6.1.4.1.674.10898.200.2 for contact 2 OID, etc.) that branches off from the address book OID, and then defining each content field that allows address book contents to be entered into the address book as an OID (e.g., 1.3.6.1.4.1.674.10898.200.1.1 for contact 1 name field OID, 1.3.6.1.4.1.674.10898.200.1.2 for contact 1 email address field OID, 1.3.6.1.4.1.674.10898.200.1.3 for contact 1 fax number field OID, 1.3.6.1.4.1.674.10898.200.2.1 for contact 2 name field OID, 1.3.6.1.4.1.674.10898.200.2.2 for contact 2 email address field OID, 1.3.6.1.4.1.674.10898.200.2.3 for contact 2 fax number field OID, etc.) that branches off from the appropriate contact OID. While a specific example has been provided to illustrate a correspondence between address book content fields in an address book and OIDs in an MIB hierarchy, one of skill in the art will recognize that the content fields and OIDs discussed above may be varied without departing from the scope of the present disclosure. For example, while the address book OID that branches off from the printer OID has been described as a single address book OID, multiple address book OIDs may be defined (e.g., multiple printer specific address book OIDs under the printers OID.)

In an embodiment, the address book 212 of the printer 202 is linked to the MIB hierarchy 214 such that information entered into the content fields in the address book 212 may be used to update corresponding OIDs in the MIB hierarchy 214. For example, when address book contents are entered or modified (e.g., using the input device 106 and/or the display 110 on the printer 202) in particular content fields in the address book 212 (e.g., a contact name field, a contact email address field, a contact fax number field, etc.), the OIDs in the MIB hierarchy 214 that correspond those address book content fields may be updated to include the newly entered or modified address book contents. The user of the printer 202 may create a contact in the address book 212 by entering a contact name, email address, and fax number in the appropriate content fields, and that information may be copied to or stored under the contact 1 OID branch (e.g., 1.3.6.1.4.1.674.10898.200.1) in the appropriate OIDs (e.g., 1.3.6.1.4.1.674.10898.200.1.1, 1.3.6.1.4.1.674.10898.200.1.2, and 1.3.6.1.4.1.674.10898.200.1.3, respectively.) Furthermore, the user of the printer 202 may create a contact in the address book 212 by entering a contact name and email address but no fax number, and that information may be copied to or stored similarly as described above but with the contact fax number field OID (e.g., 1.3.6.1.4.1.674.10898.200.1.3) left blank. Thus, the address book of the printer 202 includes a plurality of content fields that correspond to a plurality of OIDs in the MIB hierarchy 214, and address book contents located in the OIDs may be modified by modifying the information in the plurality of content fields in address book 212 of the printer 202. In an embodiment, one or more printer vendors may link printer address books of their printers to OIDs in the MIB hierarchy 214 such that a given content field (e.g., a contact 1 name field, a contact 1 email address field, etc) in the printer address books of their printers corresponds to the same OID in the MIB hierarchy 214.

Figure 3:
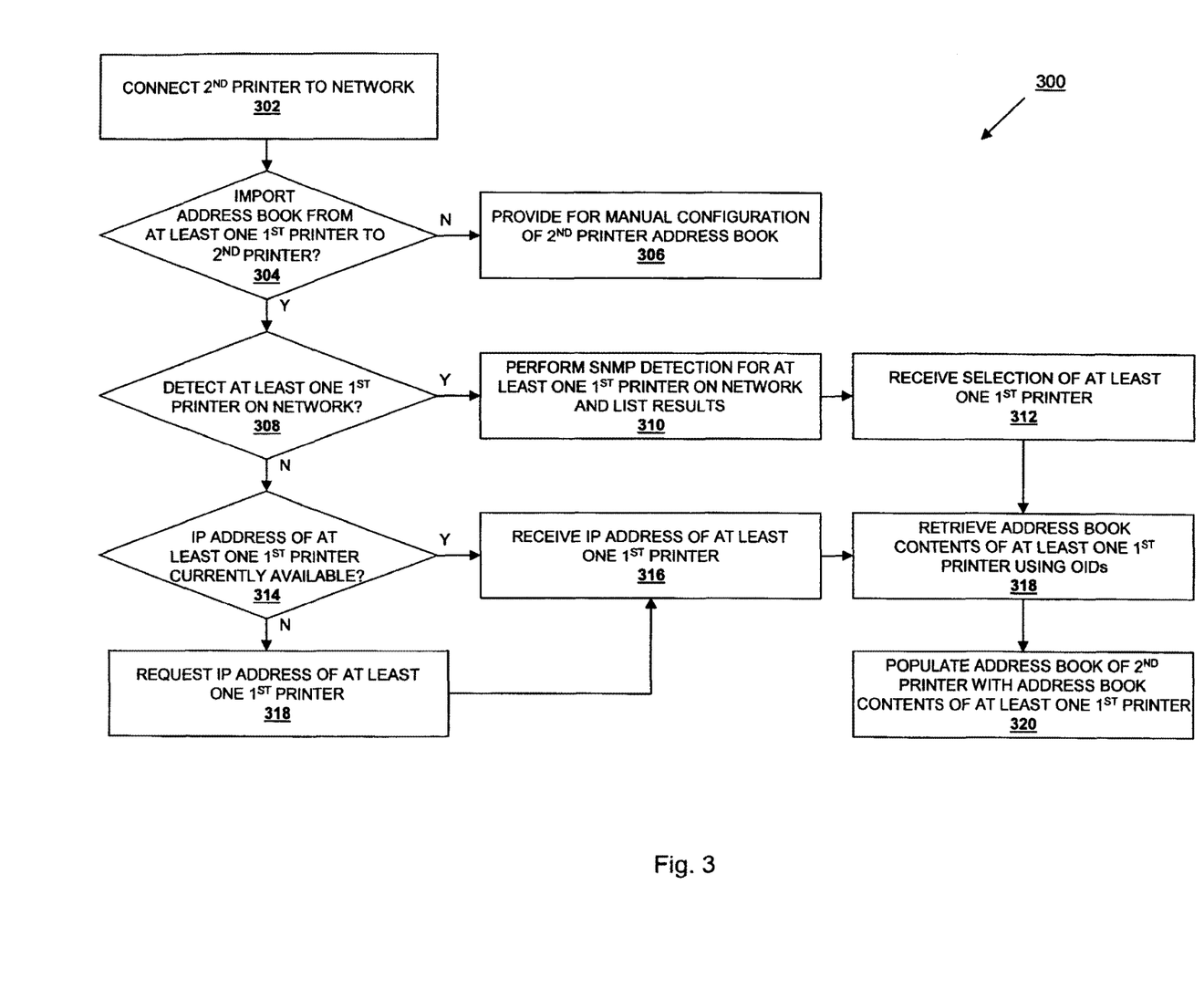
FIG. 3 is a flow chart illustrating an embodiment of a method for transferring an address book.

Referring now to FIG. 3, a method 300 for transferring an address book is illustrated. The method 300 begins at block 302 where a second printer is connected to a network. In an embodiment, the second printer 204 may be connected to the network 210 subsequent to at least one first printer having been connected to the network 210. In an embodiment, the at least one first printer is the printer 202 and includes an address book that includes a plurality of address book contents that are located in a plurality of content fields that correspond to OIDs in the MIB hierarchy 214, as discussed above. In an embodiment, the second printer 204 includes an address book that includes a plurality of content fields that correspond to OIDs in the MIB hierarchy 214, but those content fields are empty. In an embodiment, a given content field in the address books of the first printer 202 and the second printer 204 (e.g., the contact 1 email address field) corresponds to the same OID in the MIB hierarchy 214. In an embodiment, the second printer 204 includes an address book transferring engine that includes computer-readable instructions that are located on a non-transitory computer readable medium such as, for example, the mass storage device 106 or the system memory 114 described above with reference to FIG. 1, and the computer-readable instructions, when executed, cause the processor 102 to perform a variety of functions, described in further detail below. In an embodiment, the address book transferring engine may include an SNMP agent that is operable to retrieve objects from SNMP OIDs in an MIB hierarchy. In an embodiment, the second printer 204 may be a printer that is intended to replace the first printer, a printer that is being added to the networked printer system 200, etc.

The method 300 then proceeds to decision block 304 where it is determined whether an address book from one of the at least one first printers should be imported to the second printer 204. In an embodiment, the second printer 204 may use the display 110 to prompt a user to select whether or not to import an address book to the second printer 204 upon connecting the second printer 204 to the network 210. The user may then use the input device 106 and/or the display 110 to indicate to the second printer 204 whether an address book should be imported to the second printer 204. If it is determined that an address book should not be imported to the second printer 204, the method 300 then proceeds to block 306 where the second printer 204 provides for manual configuration of the printer address book for the second printer 204 by the user.

If, at decision block 304, it is determined that an address book should be imported to the second printer 204, the method 300 then proceeds to decision block 308 where it is determined whether to detect at least one first printer on the network. In an embodiment, the second printer 204 may use the display 110 to prompt a user to select whether or not to detect at least one first printer (i.e., the printers 202, 206, or 208) on the network 210. The user may then use the input device 106 and/or the display 110 to indicate to the second printer 204 whether to detect at least one first printer. If it is determined that at least one first printer should be detected, the method 300 then proceeds to block 310 where SNMP detection is performed for at least one first printer on the network and the results are listed. In an embodiment, the second printer 204 may use the communications device 116 and/or the address book transferring engine to perform an SNMP detection in order to detect the printers 202, 206, and/or 208 on the network 210. For example, the communications device 116 and/or the address book transferring engine may detect one or more IP addresses that correspond to the printers 202, 206, and/or 208 on the network 210. The second printer 204 may then list the printers 202, 206, and 208 on the display 110. The method 300 then proceeds to block 312 where the selection of at least one first printer is received. The user may use the input device 106 and/or the display 110 to select at least one first printer from which to transfer an address book from the list provided by the second printer 204 in block 310 of the method 300. In an embodiment, the user may select the printer 202 as a first printer 202 from which to transfer an address book to the second printer 204.

If, at decision block 308, it is determined that at least one first printer should not be detected, the method 300 then proceeds to decision block 314 where it is determined whether the IP address of at least one first printer is available. In an embodiment, the second printer 204 may use the display 110 to determine whether the user has an IP address of at least one first printer from which the user wishes to transfer an address book. If the user has such an IP address, the method 300 proceeds to block 316 where the user may provide the IP address (e.g., using the input device 106 and/or the display 110) of at least one of the printers 202, 206, and/or 208 from which the user wishes to transfer an address book to the second printer 204. If, at decision block 312, the user does not have such an IP address, the method 300 proceeds to block 318 where the second printer 204 may request that the user retrieve the network settings for one or more of the printers 202, 206, and/or 208 connected to the network 210 such as, for example, by printing those network settings from the printer from which the user wishes to transfer an address book. The method 300 then proceeds to block 316 where the user may provide the IP address (e.g., using the input device 106 and/or the display 110) of at least one first printer (e.g., the printer 202) from which the user wishes to transfer an address book to the second printer 204.

Following the selection of the at least one first printer at block 312 of the method 300, or the receiving of the IP address of the at least one first printer at block 316 of the method 300, the method 300 proceeds to blocks 318 and 320 where the address book contents of the at least one first printer are retrieved and used to populate the address book of the second printer 204. In an embodiment, the method 300 either receives the selection of the first printer 202 at block 312, or receives the IP address of the first printer 202 at block 316. The address book transfer engine in the second printer 204 then retrieves the plurality of address book contents that are from the address book 212 of the first printer 202 and that are located in the plurality of OIDs in the MIB hierarchy 214 and populates the address book of the second printer 204 using those address book contents. For example, the address book transferring engine may take the address book contents from the address book 212 of the printer 202 for contact 1 that are located in the contact 1 OID branch (e.g., 1.3.6.1.4.1.674.10898.200.1) in the appropriate OIDs (e.g., 1.3.6.1.4.1.674.10898.200.1.1 for contact 1 name OID, 1.3.6.1.4.1.674.10898.200.1.2 for contact 1 email address OID, 1.3.6.1.4.1.674.10898.200.1.3 for contact 1 fax number OID) and populate the content fields for a first contact in an address book of the second printer 204. Populating the content fields of the address book of the second printer 204 with address book contents in the OIDs in the MIB hierarchy 214 is simplified when given content fields of the address books of the first printer 202 and the second printer 204 correspond to the same OIDs in the MIB hierarchy 214. The address book transfer engine may then do the same with address book contents for each contact in the address book 212 of the first printer 202 in order to transfer the address book contents of the address book 212 from the first printer 202 to the second printer 204. In an embodiment, the address book transferring engine is an SNMP agent that performs the functions described above to allow direct communication between the second printer 204 and the first printer 202 over the network 210 (i.e., without the need to connect an external computing device or IHS to either of the printers 202 or 204 in order to allow communication) in order to import the address book contents from the first printer 202 to the address book of the second printer 204.

Thus, a system and method have been described that allow the address book from a first printer to be transferred to second printer through direct communication between the first and second printer over a network. The linking of content fields in the address books of the first and second printer to the same OIDs in an MIB hierarchy allow the address book contents in the address book of the first printer that are copied or stored in the OIDs to be easily retrieved and used to quickly and accurately populate the appropriate content fields in the address book of the second printer. This allows for the transfer of address book contents between printers without the need to copy and store the address book on an IHS. Furthermore, if the OIDs used for the content fields are standardized (e.g., a specific OID corresponding to a contact 1 name, a specific OID corresponding to a contact 1 email address, etc.), different content field formats across address books will not complicate their transfer as long as the appropriate content fields are linked correctly to the standardized OIDs.

The system 200 and method 300 described above are contemplated as allowing for the sharing and transferring of address books between printers in a variety of manners. For example, the OIDs in the MIB hierarchy that are linked to the content fields in the address book of a printer have been described above as being linked to a single printer. In an embodiment, referring to FIG. 2a, the printer 202 may be connected to the network 210 and include the address book whose content fields are linked to the OIDs in the MIB hierarchy such that the address book contents in those content fields are copied or stored in the OIDs in the MIB hierarchy. When printers 204, 206, and 208 are connected to the network 210, the method 300 may be performed to transfer the address book contents from the address book of the first printer 202 to each of the printers 204, 206, and 208.

In an embodiment, with all the printers 202, 204, 206, and 208 connected to the network 210 and including the same address book contents (transferred using the method 300), each of the printers 202, 204, 206, and 208 may have the content fields of their address books linked to OIDs in the MIB hierarchy such that any of the printers 202, 204, 206, or 208 may modify or add address book contents in the OIDs in the MIB hierarchy, and each the printers 202, 204, 206, and 208 may be regularly updated with the address book contents copied or stored in the OIDs in the MIB hierarchy. In another embodiment, one printer (e.g., printer 202) may be designated as the printer that may modify or add address book contents in the OIDs in the MIB hierarchy, and the other printers (e.g., printers 204, 206, and 208) may or may not be updated with those address book contents that are copied or stored in the OIDs in the MIB hierarchy.

In another example, the OID branches in the MIB hierarchy may be defined for different printer address books that belong to different printers. In an embodiment, referring to FIG. 2a, the printer 202 may be connected to the network 210 and include an address book whose content fields are linked to the OIDs in the MIB hierarchy that are defined under an address book OID branch that is specific to the printer 202, while the printer 204 may be connected to the network 210 and include an address book whose content fields are linked to the OIDs in the MIB hierarchy that are defined under an address book OID branch that is specific to the printer 204. In an embodiment, when the printer 206 is connected to the network, a user may be given the option to transfer the address book from the printer 202 or the printer 204. In another embodiment, when the printer 206 is connected to the network, a user may be given the option to transfer the address books from both of the printers 202 and 204, and the address book transferring engine may be operable to, for example, retrieve the address book contents from the OIDs under both the address book OID branch specific to the printer 202 and the address book OID branch specific to the printer 204 and transfer them to the appropriate content fields in the address book for the printer (e.g., by transferring address book contents associated with the address book of the printer 202 first, then transferring the address book contents associated with the address book of the printer 204 starting in the address book of the printer 206 with the first contact that has all of its content fields blank.) In an embodiment, when transferring the address books from the printers 202 and 204 to the address book of the printer 206, the content fields of the address book of the printer 206 may be linked to OIDs under an address book OID branch that is specific to the printer 206 such that the combined transferred address book contents from the address books of the printers 202 and 204 are copied or stored in OIDs under an address book OID branch that is specific to the printer 206.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A first printer, comprising:
a first printer chassis housing a processor;
a communications device located in the first printer chassis and coupled to the processor;
a display device located on the first printer chassis and coupled to the processor;
at least one computer-readable medium located in the first printer chassis and coupled to the processor, wherein the at least one computer-readable medium includes a first printer address book that is configured to store each of a plurality of address book contents in respective first content field format entries of a first content field format, wherein each respective first content field format entry is linked to a respective Simple Network Management Protocol (SNMP) Object Identifier (OID) that is included in an Management Information Base (MIB) and that is standardized to store a type of information included in that respective first content field format entry; and
an address book transferring engine that is provided by the processor executing computer-readable instructions on the at least one computer-readable medium, wherein the address book transferring engine is configured to:
determine a plurality of other printers that are coupled to the communications device through a network and, in response, provide the plurality of other printers for display on the display device;
receive, by the display device, a selection of a second printer of the plurality of other printers from which to transfer a second printer address book that includes a plurality of second printer address book contents in respective second content field format entries of a second content field format that is different than the first content field format such that at least some of the respective second content field format entries store different types of information than the respective first content field format entries, wherein each second content field format entry that stores a particular type of information is linked to the same respective SNMP OIDs that is included in the MIB, that is standardized to store that particular type of information, and that is linked to a corresponding first content field format entry that includes that particular type of information, and in response to the received selection:
directly connect to the second printer through the communications device over the network to establish direct communication between the second printer and the first printer through the network;
retrieve, from the second printer through the direct communication, the plurality of second printer address book contents from the respective second content field format entries of the second content field format; and
provide a plurality of first printer address book contents in the first content field format entries of the first content field format on the first printer by transferring each of the plurality of second printer address book contents that were retrieved from the second content field format entries of the second content field format to the corresponding first content field format entries of the first content field format based on the linking of each respective second content field format entry and corresponding first content field format entry to the same SNMP OID in the MIB that stores the type of information included in that respective second content field format entry and corresponding first content field format entry.

2. The first printer of claim 1, further comprising:
an input device located on the first printer chassis and coupled to the processor, wherein the input device is configured to provide input to the processor in response to the display device displaying input choices.

3. The first printer of claim 1, wherein the direct communication between the first printer and the second printer is free of an external computing device connected to the first printer or the second printer and provides for the transferring of the plurality of second printer address book contents to the first printer.

4. The first printer of claim 1, wherein the address book transferring engine further comprises computer-readable instructions that when executed:
retrieve IP addresses of the plurality of other printers over the network using the communications device.

5. The first printer of claim 1, wherein the address book transferring engine further comprises computer-readable instructions that when executed:
correlates each of the second content field format entries of the second content field format to the corresponding first content field format entries of the first content field format based on the linking of each respective second content field format entry and corresponding first content field format entry to the same SNMP OID in the MIB that stores the type of information included in that respective second content field format entry and corresponding first content field format entry.

6. The first printer of claim 1, wherein the second printer includes a plurality of different printer address books, and wherein the address book transferring engine further comprises computer-readable instructions that when executed:
retrieve the plurality of different printer address books and, in response, provide the plurality of different printer address books for display on the display device; and
receive a selection of at least one of the plurality of different printer address books that includes the second printer address book.

7. The first printer of claim 1, wherein the address book transferring engine further comprises computer-readable instructions that when executed:
receive a selection of a third printer of the plurality of other printers from which to transfer a third printer address book that includes a plurality of third printer address book contents in respective third content field format entries of a third content field format that is different than the first content field format such that at least some of the respective third content field format entries store different types of information than the respective first content field format entries, wherein each third content field format entry that stores a particular type of information is linked to the same respective SNMP OIDs that is included in the MIB, that is standardized to store that particular type of information, and that is linked to a corresponding first content field format entry that includes that particular type of information, and in response to the received selection:
directly connect to the third printer through the communications device over the network to establish direct communication between the second printer and the first printer through the network;

retrieve, from the third printer through the direct communication, the plurality of third printer address book contents from the respective third content field format entries of the third content field format; and provide the plurality of first printer address book contents in the first content field format entries of the first content field format on the first printer by transferring each of the plurality of third printer address book contents that were retrieved from the third content field format entries of the third content field format to the corresponding first content field format entries of the first content field format based on the linking of each respective third content field format entry and the corresponding first content field format entry to the same SNMP OID in the MIB that stores the type of information included in that respective third content field format entry and corresponding first content field format entry.

8. The first printer of claim 1, wherein the SNMP OIDs are located in a Management Information Base (MIB) hierarchy under a private branch that is defined by a vendor.

9. A networked printer system, comprising:
a plurality of first printers coupled to a network, wherein each of the plurality of first printers includes a first printer address book having a plurality of first printer address book contents in respective first content field format entries of a first content field format, wherein each respective first content field format entry is linked to a respective Simple Network Management Protocol (SNMP) Object Identifier (OID) that is included in an Management Information Base (MIB) and that is standardized to store a type of information included in that respective first content field format entry; and
a second printer coupled to the network, wherein the second printer comprises:
a processor;
a communications device coupled to the processor;
a display device coupled to the processor;
at least one computer-readable medium coupled to the processor and including a second printer address book that is configured to store each of a plurality of address book contents in respective second content field format entries of a second content field format that is different than the first content field format such that at least some of the respective second content field format entries store different types of information than the respective first content field format entries, wherein each second content field format entry that stores a particular type of information is linked to the same respective SNMP OIDs that is included in the MIB, that is standardized to store that particular type of information, and that is linked to a corresponding first content field format entry that includes that particular type of information; and
an address book transferring engine that is provided by the processor executing computer-readable instructions on the at least one computer-readable medium, wherein the address book transferring engine is configured to:
provide the plurality of first printers for display on the display device;
receive, by the display device, a selection of at least one selected printer of the plurality of first printers from which to transfer a first printer address book and, in response to the received selection and no further user input:

directly connect to the at least one selected printer through the communications device over the network to establish direct communication between the at least one selected printer and the second printer through the network;
retrieve, from the at least one selected printer through the direct communication, the plurality of first printer address book contents from the respective first content field format entries of the first content field format; and
provide a plurality of second printer address book contents in the second content field format entries of the second content field format on the second printer by transferring each of the plurality of first printer address book contents that were retrieved from the first content field format entries of the first content field format to the corresponding second content field format entries of the second content field format based on the linking of each respective first content field format entry to corresponding second content field format entries to the same SNMP OID in the MIB that stores the type of information included in that respective first content field format entry and corresponding second content field format entry.

10. The system of claim 9, further comprising:
an input device coupled to the processor, wherein the input device is configured to provide input to the processor in response to the display displaying input choices.

11. The system of claim 9, wherein the direct communication between the at least one selected printer and the second printer is free of an external computing device connected to the at least one selected printer or the second printer and provides for the transferring of the plurality of first printer address book contents to the second printer.

12. The system of claim 9, wherein the address book transferring engine further comprises computer-readable instruction that when executed:
retrieve IP addresses of the plurality of first printers over the network using the communications device.

13. The system of claim 9, wherein the address book transferring engine further comprises computer-readable instructions that when executed:
correlates each of the first content field format entries of the first content field format to the corresponding second content field format entries of the second content field format based on the linking of each respective first content field format entry and corresponding second content field format entries to the same SNMP OID in the MIB that stores the type of information included in that respective first content field format entry and corresponding second content field format entry.

14. The system of claim 9, wherein the SNMP OIDs are located in a Management Information Base (MIB) hierarchy under a private branch that is defined by a vendor.

15. The system of claim 9, wherein one of the at least one selected printer includes a first printer having a plurality of different printer address books, and wherein the address book transferring engine further comprises computer-readable instruction that when executed:
retrieve the plurality of different printer address books from the first printer and, in response, provide the plurality of different printer address books for display on the display device; and receive a selection of at least one of the plurality of different printer address books that includes the first printer address book.

16. A method for transferring an address book, comprising:

connecting a first printer to a network that includes a first printer address book that is configured to store each of a plurality of address book contents in respective first content field format entries of a first content field format, wherein each respective first content field format entry is linked to a respective Simple Network Management Protocol (SNMP) Object Identifier (OID) that is included in an Management Information Base (MIB) and that is standardized to store a type of information included in that respective first content field format entry;

determining a plurality of other printers that are coupled to the network and, in response, providing the plurality of other printers for display on a display device included on the first printer;

receiving, by the display device, a selection of a second printer of the plurality of other printers from which to transfer a second printer address book that includes a plurality of second printer address book contents in respective second content field format entries of a second content field format that is different than the first content field format such that at least some of the respective second content field format entries store different types of information than the respective first content field format entries, wherein each second content field format entry that stores a particular type of information is linked to the same respective SNMP OIDs that is included in the MIB, that is standardized to store that particular type of information, and that is linked to a corresponding first content field format entry that includes that particular type of information, and in response to the received selection:

connecting the first printer to a second printer over the network to establish a direct communication between the first printer and the second printer through the network;

retrieving, from the second printer through the direct communication, the plurality of second printer address book content from the respective second content field format entries of the second content field format s; and providing a plurality of first printer address book contents in the first content field format entries of the first content field format on the first printer by transferring each of the plurality of second printer address book contents that were retrieved from the second content field format entries of the second content field format to the corresponding first content field format entries of the first content field format based on the linking of each respective second content field format entry and corresponding first content field format entry to the same SNMP OID in the MIB that stores the type of information included in that respective second content field format entry and corresponding first content field format entry.

17. The method of claim 16, wherein second printer includes a plurality of different printer address books, and wherein the method further comprises:

retrieving the plurality of different printer address books and, in response, providing the plurality of different printer address books for display on the display device; and receiving a selection of at least one of the plurality of different printer address books that includes the second printer address book.

18. The method of claim 16, further comprising:

correlating each of the second content field format entries of the second content field format to the corresponding first content field format entries of the first content field format based on the linking of each respective second content field format entry and corresponding first content field format entry to the same SNMP OID in the MIB that stores the type of information included in that respective second content field format entry and corresponding first content field format entry.

* * * * *